US008488901B2

(12) United States Patent
Berestov et al.

(10) Patent No.: US 8,488,901 B2
(45) Date of Patent: Jul. 16, 2013

(54) CONTENT BASED ADJUSTMENT OF AN IMAGE

(75) Inventors: Alexander Berestov, San Jose, CA (US); Chuen-Chien Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1090 days.

(21) Appl. No.: 11/906,070

(22) Filed: Sep. 28, 2007

(65) Prior Publication Data

US 2009/0087016 A1   Apr. 2, 2009

(51) Int. Cl.
*G06K 9/40*   (2006.01)
*G06K 9/46*   (2006.01)
*G09G 5/00*   (2006.01)
*G09G 5/22*   (2006.01)

(52) U.S. Cl.
USPC ............ 382/274; 382/254; 382/286; 345/10; 345/20; 345/619; 345/628

(58) Field of Classification Search
USPC ............ 382/274, 254, 286; 345/10, 20, 619, 345/625
See application file for complete search history.

(56) References Cited

U.S. PATENT DOCUMENTS

| | | | |
|---|---|---|---|
| 5,488,434 A | 1/1996 | Jung | |
| 5,528,339 A | 6/1996 | Buhr et al. | |
| 5,539,523 A | 7/1996 | Nakai et al. | |
| 5,721,792 A | 2/1998 | Thompson | |
| 6,263,502 B1 * | 7/2001 | Morrison et al. | 725/47 |
| 6,393,148 B1 | 5/2002 | Bhaskar | |
| 6,581,170 B1 | 6/2003 | Kondo et al. | |
| 6,763,069 B1 | 7/2004 | Divakaran et al. | |
| 6,778,183 B1 | 8/2004 | Nair et al. | |
| 6,831,755 B1 * | 12/2004 | Narushima et al. | 358/1.9 |
| 6,954,549 B2 * | 10/2005 | Kraft | 382/167 |
| 7,085,613 B2 * | 8/2006 | Pitman et al. | 700/94 |
| 7,187,343 B2 * | 3/2007 | Pate | 345/1.2 |
| 7,221,780 B1 | 5/2007 | Wang | |
| 7,400,314 B1 * | 7/2008 | Agano | 345/102 |
| 7,881,555 B2 * | 2/2011 | Spahn | 382/274 |
| 2003/0227577 A1 * | 12/2003 | Allen et al. | 348/742 |
| 2004/0057517 A1 * | 3/2004 | Wells | 375/240.16 |
| 2004/0075665 A1 * | 4/2004 | Ito | 345/581 |

(Continued)

FOREIGN PATENT DOCUMENTS

EP   1139653 A2   10/2001
JP   8107535 A2   4/1996

OTHER PUBLICATIONS

Truong, et al. "Automatic Genre Identification for Content-Based Video Categorization." Pattern Recognition, 2000. Proceedings. 15th International Conference on . 4. (2000): 230-233. Print.*

(Continued)

*Primary Examiner* — Michael A Newman
(74) *Attorney, Agent, or Firm* — Blakely, Sokoloff, Taylor & Zafman LLP

(57) ABSTRACT

A video input signal is analyzed to detect image content and image properties, wherein detecting the image content includes automatically deriving image features. A content group is determined for the video input signal based on the detected image content, the content group including predefined image properties. The image properties of the video input signal are adjusted based on a difference between the detected image properties and the predefined image properties.

23 Claims, 8 Drawing Sheets

U.S. PATENT DOCUMENTS

| | | | |
|---|---|---|---|
| 2004/0085339 A1* | 5/2004 | Divakaran et al. | 345/721 |
| 2004/0100478 A1 | 5/2004 | Bianchi et al. | |
| 2004/0131340 A1 | 7/2004 | Antoun et al. | |
| 2004/0207759 A1 | 10/2004 | Li et al. | |
| 2005/0163393 A1 | 7/2005 | Asari | |
| 2005/0174359 A1* | 8/2005 | Yu | 345/589 |
| 2005/0231602 A1* | 10/2005 | Obrador et al. | 348/208.14 |
| 2005/0251273 A1* | 11/2005 | Bychowsky et al. | 700/94 |
| 2006/0012586 A1* | 1/2006 | Ochs et al. | 345/204 |
| 2006/0088213 A1 | 4/2006 | Enomoto | |
| 2006/0092441 A1 | 5/2006 | Quan et al. | |
| 2006/0195861 A1* | 8/2006 | Lee | 725/19 |
| 2006/0204124 A1 | 9/2006 | Aihara | |
| 2006/0225088 A1* | 10/2006 | Gutta | 725/14 |
| 2006/0232823 A1 | 10/2006 | Hooper | |
| 2006/0268180 A1 | 11/2006 | Chou | |
| 2006/0274978 A1 | 12/2006 | Fukuda et al. | |
| 2007/0010221 A1* | 1/2007 | Howard et al. | 455/179.1 |
| 2007/0014554 A1* | 1/2007 | Sasaki et al. | 396/55 |
| 2007/0055955 A1* | 3/2007 | Lee et al. | 717/113 |
| 2007/0092153 A1* | 4/2007 | Kagaya et al. | 382/254 |
| 2007/0242162 A1* | 10/2007 | Gutta et al. | 348/645 |
| 2008/0030450 A1* | 2/2008 | Yamagishi et al. | 345/89 |
| 2008/0266459 A1* | 10/2008 | Butterworth | 348/649 |
| 2010/0128067 A1* | 5/2010 | Lee | 345/690 |

OTHER PUBLICATIONS

Mason, et al. "Video Genre Classification Using Dynamics." Acoustics, Speech, and Signal Processing, 2001. Proceedings. (ICASSP '01). 2001 IEEE International Conference on. 3. (2001): 1557-1560. Print.*

Truong et al. "Automatic Genre Identification for Content-Based Video Categorization." Pattern Recognition, 2000. Proceedings. 15th International Conference on. 4. (2000): 230-233. Print.*

PCT International Search Report and Written Opinion for International Application No. PCT/US08/77411, mailed Dec. 12, 2008, 10 pages.

CyberLink PowerDVD 5 Manual, 104 pages, CyberLink Corporation, 15F, #100, Min-Chuan Road, Hsin Tian City, Taipei County, Taiwan 231. Copyright 1997-2003 CyberLink Corporation, Taipei, Taiwan, ROC.

Tumblin, Jack, et al., "Two Methods for Display of High Contrast Images," Jul. 16, 1998, 40 pages, Microsoft Research, Bellevue WA. Laboratory of Media Technology, "Automatic Colour Image Enhancement," 3 pages, downloaded from http://www.media.hut.fi/~color/automatic_enhancement.html on Sep. 27, 2007.

TDA9178 Data Sheet: "YUV one chip picture improvement based on luminance vector-, colour vector-, and spectral processor" Sep. 24, 1999. Philips Semiconductors, Preliminary Specification, 36 pages.

Whatmough, Robert "Viewing Low Contrast, High Dynamic Range Images with MUSCLE" 8 pages, Copyright 2005 Commonwealth of Australia 0-7695-2467-2/05 IEEE Computer Society.

"Picture Styles", Canon EOS 30D—Hands-on Review, Bob Atkins Photography Digital Home Page, 4 pages, Copyright Bob Atkins, last modified Oct. 23, 2006. www.bobatkins.com Downloaded from the Internet Jul. 19, 2007.

* cited by examiner

CONTENT BASED ADJUSTMENT OF AN IMAGE

FIELD OF THE INVENTION

This invention relates generally to adjusting a video signal, and more particularly to adjusting image display settings based on signal properties, image properties and image contents.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright © 2006, Sony Electronics Inc., All Rights Reserved.

BACKGROUND OF THE INVENTION

Modern televisions and monitors typically include multiple different image adjustment mechanisms. A user can navigate through a display menu to manually adjust image display settings such as brightness, contrast, sharpness, hue, etc. As image display settings are adjusted, an image will appear differently on the television or monitor.

Some televisions and monitors also include one or more preset display modes, each of which includes preset hue, sharpness, contrast, brightness, and so on. A user can select a preset display mode by navigating through the display menu. Some display modes can more accurately display certain images than other display modes. For example, a sports display mode can include image display settings that are generally considered best for watching sporting events. Likewise, a cinema display mode can include image display settings that are generally considered best for watching most movies. However, to take advantage of such preset display modes, a user must manually change the display mode each time the user changes what he or she is watching. Moreover, the preset display modes apply throughout a movie (for every scene), sporting event, etc. However, a particular preset display mode can not include the best image display settings throughout a program, movie or sporting event.

SUMMARY OF THE INVENTION

A video input signal is analyzed to detect image properties and image content, wherein detecting the image content includes automatically deriving image features. A content group is determined for the video input signal based on the detected image content. Each content group includes predefined image properties. Image display settings are adjusted based on a difference between the detected image properties and the predefined image properties.

DETAILED DESCRIPTION OF THE INVENTION

Figure 1A:
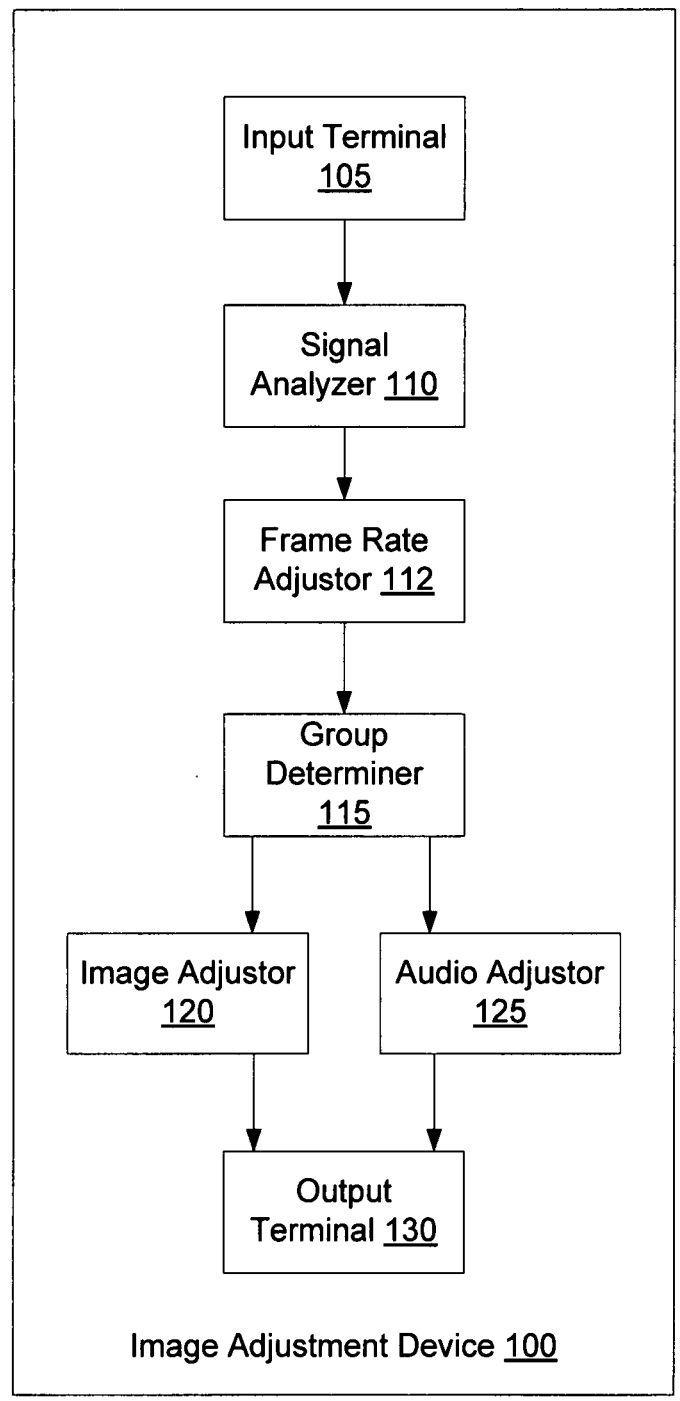
FIG. 1A illustrates one embodiment of a image adjustment device.

In the following detailed description of embodiments of the invention, reference is made to the accompanying drawings in which like references indicate similar elements, and in which is shown by way of illustration specific embodiments in which the invention can be practiced. These embodiments are described in sufficient detail to enable those skilled in the art to practice the invention, and it is to be understood that other embodiments can be utilized and that logical, mechanical, electrical, functional and other changes can be made without departing from the scope of the present invention. The following detailed description is, therefore, not to be taken in a limiting sense, and the scope of the present invention is defined only by the appended claims.

For the sake of clarity, the following definitions of terms are provided.

The term "signal properties" refers to properties of a video signal or still image signal. Signal properties can include metadata (e.g., of a title, time, date, GPS coordinates, etc.), signal structure (e.g., interlaced or progressive scan), encoding (e.g., MPEG-7), signal noise, etc.

The term "image properties" refers to properties of an image that can be displayed from a signal. Image properties can include image size, image resolution, frame rate, dynamic range, color cast (predominance of a particular color), histograms (number of pixels at each grayscale value within an image for each color channel), blur, image noise, etc.

The term "image contents" refers to the objects and scenes, as well as properties of the objects and scenes, that viewers will recognize when they view an image (e.g., the objects and scenes acquired by a camera). Image contents include high level image features (e.g., faces, buildings, people, animals, landscapes, etc.) and low level image features (e.g., textures, real object colors, shapes, etc.).

The term "image display settings" refers to settings of a display that can be adjusted to modify the way an image appears on the display. Image display settings are a property of a display device, where as signal properties, image properties and image contents are properties of a signal. Image display settings can include screen resolution (as opposed to image resolution), refreshment rate, brightness, contrast, hue, saturation, white balance, sharpness, etc.

The term "displayed image properties" refers to the properties of an image after it has been processed by a display device (or image adjustment device). Displayed image properties can include the same parameters as "image properties," but the values of the parameters may be different. Image display settings typically affect displayed image properties.

Beginning with an overview of the operation of the invention, FIG. 1 illustrates one embodiment of an image adjustment device 100. Image adjustment device 100 can modify one or more image display settings (e.g., contrast, brightness, hue, etc.) to cause displayed image properties (e.g., dynamic range, blur, image noise, etc.) to differ from image properties of an input signal. Alternatively, image adjustment device 100 can modify an input signal to generate an output signal having modified image properties. To modify the image display settings, image adjustment device 100 can analyze a video input to detect image properties and image content. Image adjustment device 100 can determine a content group for (and apply the content group to) the video input signal based on the detected image content, and apply an appropriate content group. The content group can include predefined image properties that are compared to the detected image properties to determine how to modify the image display settings. Modifying the image display settings can generate an image that is easier to see, more aesthetically pleasing, a more accurate representation of a recorded image, etc.

Image adjustment device 100 can be used to intercept and modify a video signal at any point between a signal source and an ultimate display of the video signal. For example, the image adjustment device 100 can be included in a television or monitor, a set top box, a server side or client side router, etc. While the invention is not limited to any particular logics or algorithms for content detection, content group assignment or image display setting adjustment, for sake of clarity a simplified image adjustment device 100 is described.

In one embodiment, image adjustment device 100 includes logic executed by a microcontroller 105, field programmable gate array (FPGA), application specific integrated circuit (ASIC), or other dedicated processing unit. In another embodiment, image adjustment device 100 can include logic executed by a central processing unit. Alternatively, image adjustment device 100 can be implemented as a series of state machines (e.g., an internal logic that knows how to perform a sequence of operations), logic circuits (e.g., a logic that goes through a sequence of events in time, or a logic whose output changes immediately upon a changed input), or a combination of a state machines and logic circuits.

In one embodiment, image adjustment device 100 includes an input terminal 105, signal analyzer 110, frame rate adjustor 112, group determiner 115, image adjustor 120, audio adjustor 125 and output terminal 130. Alternatively, one or more of the frame rate adjustor 112, group determiner 115, image adjustor 120 and audio adjustor 125 can be omitted.

Input terminal 105 receives an input signal. The input signal can be a video input signal or a still image input signal. Examples of video input signals that can be received include digital video signals (e.g., an advanced television standards committee (ATSC) signal, digital video broadcasting (DVB) signal, etc.) or analog video signals (e.g., a national television standards committee (NTSC) signal, phase alternating line (PAL) signal, sequential color with memory (SECAM) signal, PAL/SECAM signal, etc.). Received video and/or still image signals can be compressed (e.g., using motion picture experts group 1 (MPEG-1), MPEG-2, MPEG-4, MPEG-7, video codec 1 (VC-1), etc.) or uncompressed. Received video input signals can be interlaced or non-interlaced.

Input terminal 105 is coupled with signal analyzer 110, to which it can pass the received input signal. Signal analyzer 110 can analyze the input signal to determine signal properties, image contents and/or image properties. Examples of image properties that can be determined include image size, image resolution, dynamic range, color cast, etc. Examples of signal properties that can be determined include encoding, signal noise, signal structure (interlaced or progressive scan), etc. In one embodiment, determining image contents includes deriving image features of the input signal. Both high level image features (e.g., faces, buildings, people, animals, landscapes, etc.) and low level image features (e.g., texture, color, shape, etc.) can be derived. Signal analyzer 110 can derive both low level and high level image features automatically. Signal analyzer 110 can then determine content based on a combination of derived image features. Signal Analyzer 110 is discussed in more detail below with reference to FIG. 1B.

Referring to FIG. 1A, in one embodiment, image adjustment device 100 includes frame rate adjustor 112. In one embodiment, frame rate adjustor 112 has an input connected to an output of signal analyzer 110 (as shown). In another embodiment, frame rate adjustor 112 has an input connected to an output of group determiner 115, image adjustor 120 and/or audio adjustor 125.

Frame rate adjustor 112 can adjust a frame rate of a video input signal based on signal properties, image contents and/or motion detected by signal analyzer 110. In one embodiment, frame rate adjustor 112 increases the frame rate if image features are detected to have a motion that is greater than a threshold value. In one embodiment, a threshold of the frame rate is determined based on a speed of the moving objects. For example, a threshold may indicate that between frames an object should not move more than three pixels. Therefore, if an object is detected to move more than three pixels between two frames, the frame rate can be increased until the object moves three pixels or less between frames.

The amount of increase in the frame rate can also depend on a difference between the threshold and the detected motion. Alternatively, a lookup table or other data structure can include multiple entries, each of which associates motion vectors or amount of blur with specified frame rates. In one embodiment, an average global movement is used to determine whether to adjust the frame rate. Alternatively, frame rate adjustment can be based on a fastest moving image feature.

In one embodiment, group determiner 115 has an input connected with an output of frame rate adjustor 112. In an alternative embodiment, group determiner 115 has an input connected with an output of signal analyzer 110. Group determiner 115 receives low level and high level features that have been derived by signal analyzer 110. Based on the low level and/or high level features, group determiner 115 can determine a content group (also referred to as a content mode) for the input signal, and assign the determined content group to the signal. For example, if the derived image features include a sky, a natural landmark and no faces, a landscape group can be determined and assigned. If, on the other hand, multiple faces are detected without motion, a portrait group can be determined and assigned.

In one embodiment, group determiner 115 assigns a single content group to the image. Alternatively, group determiner 115 can divide the image into multiple image portions. The image can be divided into multiple image portions based on spatial arrangements (e.g., top half of image vs. lower half of image), based on boundaries of derived features, or based on other criteria. Group determiner 115 can then determine a first content group for a first image portion containing first image features, and determine a second content group for a second image portion containing second image features. The input signal can also be divided into more than two image portions, each of which can be assigned different content groups. Group determiner 115 is discussed in more detail below with reference to FIG. 1C.

Referring to FIG. 1A, in one embodiment, the image adjustment device 100 includes an image adjustor 120 having an input coupled with an output of group determiner 115. As described above, each content group includes a collection of predefined image properties. Image adjustor 120 can adjust one or more image display settings based on a comparison of detected image properties (as detected by signal analyzer 110) to predefined image properties of the assigned content group or groups. A difference between the detected image properties and the predefined image properties can determine a magnitude of the adjustments to the image display settings. Alternatively, image adjustor 120 can modify the input signal such that when displayed on a display having known image display settings, displayed images will have the predefined image properties.

In one embodiment, the image adjustment device 100 includes an audio adjustor 125 having an input coupled with an output of group determiner 115. Audio adjustor 125 can adjust one or more audio settings (e.g., volume, equalization, audio playback speed, etc.) based on a comparison of detected audio properties (as detected by signal analyzer 110) to predefined audio properties of the assigned content group or groups. Where multiple content groups have been assigned to an input signal, audio settings can be modified based on differences between the detected audio properties and the predefined audio properties of one of the content groups, or based on an average or other combination of the audio properties of assigned content groups.

Output terminal 130 can have an input connected with outputs of one or more of frame rate adjustor 112, image adjustor 120 and audio adjustor 125. In one embodiment, output terminal 130 includes a display that displays the input signal using adjusted image display settings and/or an adjusted frame rate. Output terminal 130 can also include speakers that emit an audio portion of the input signal using adjusted audio settings.

In another embodiment, output terminal 130 transmits an output signal to a device having a display and/or speakers. Output terminal 130 can produce the output signal based on adjustment directives received from one or more of the frame rate adjustor 112, image adjustor 120 and audio adjustor 125. The output signal, when displayed on a display device having known image display settings, can have the predefined image properties of the determined content group (or content groups). The output signal, when displayed on the display device, can also have an adjusted frame rate and/or predefined audio properties of the determined content group.

In yet another embodiment, output terminal 130 transmits the input signal to a device having a display and/or speakers along with an image display settings modification signal. The image display settings modification signal can direct a display device to adjust its image display settings to display the image such that predefined image properties of determined content groups are shown. The image display settings modification signal can be metadata that is appended to the input signal.

Figure 1B:
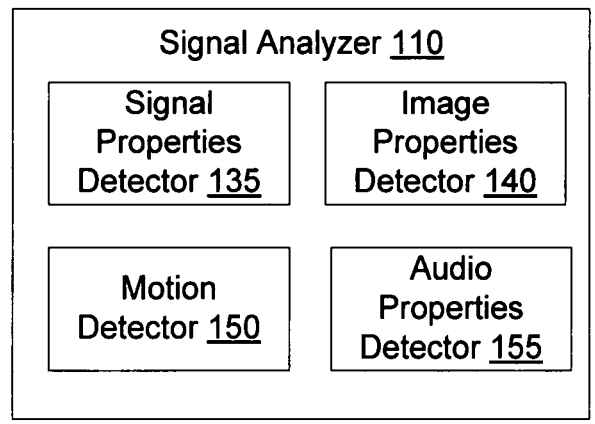
FIG. 1B illustrates an exemplary signal analyzer, in accordance with one embodiment of the present invention.

FIG. 1B illustrates an exemplary signal analyzer 110, in accordance with one embodiment of the present invention. Signal analyzer 110 can analyze the input signal to determine signal properties, image contents and/or image properties. In one embodiment, determining image contents includes deriving image features of the input signal. Both high level image features (e.g., faces, buildings, people, animals, landscapes, etc.) and low level image features (e.g., texture, color, shape, etc.) can be derived. Signal analyzer 110 can then determine content based on a combination of derived image features.

If a received signal is compressed, one or more signal properties, image properties and/or image content can be determined while the signal remains compressed. The signal can then be decompressed, and additional signal properties, image properties and/or image contents can subsequently be determined. Some signal properties, image properties and/or image contents can be easier to detect while the image is compressed, while other signal properties, image properties and/or contents can be easier to determine after the image is decompressed. For example, noise detection can be performed on compressed data, while face detection can be performed on decompressed data.

Signal analyzer 110 can analyze the signal dynamically as the signal is received on a frame-by-frame basis (e.g., every frame, every other frame, etc., can be analyzed separately), or as a sequence of frames (e.g., every three frames can be analyzed together). Where a sequence of frames is analyzed together, image contents appearing in one of the frames can be applied to each of the frames in the sequence. Alternatively, image contents may not be applied to the frames unless the image content appears in each frame in the sequence.

In one embodiment, signal analyzer 110 includes a signal properties detector 135, an image properties detector 140. In further embodiments, signal analyzer 110 also includes a motion detector 150 and an audio properties detector 155.

Signal properties detector 135 analyzes the input signal to determine signal properties (e.g., encoding, signal noise, signal structure, etc.). For example, signal properties detector 135 may analyze the input signal to read any metadata attached to the signal. Such metadata can provide information about the image contents and/or image properties. For example, MPEG-7 encoded video signals include metadata that can describe image contents, audio information, and other signal details. Signal properties detector 135 may also determine, for example, a signal to noise ratio, or whether the signal is interlaced or non-interlaced.

In one embodiment, image properties detector 140 determines image properties such as image size, image resolution, color cast, etc., of the input signal. In one embodiment, image properties detector 140 derives image features of the input signal, which may then be used to determine image contents of the input signal. Image properties detector 140 may derive both high level image features (e.g., faces, buildings, people, animals, landscapes, etc.) and low level image features (e.g., texture, color, shape, etc.) from the input signal. Image properties detector 140 can derive both low level and high level image features automatically. Exemplary techniques for deriving some possible image features known to those of ordinary skill in the art of content based image retrieval are described below. However, other known techniques can be used to derive the same or different image features.

In one embodiment, image properties detector 140 analyzes the input signal to derive the colors contained in the signal. Derived colors and the distribution of the derived colors within the image can then be used alone, or with other low level features, to determine high level image features and/or image contents. For example, if the image has a large percentage of blue in a first image portion and a large percentage of yellow in another image portion, the image can be an image of a beachscape. Colors can be derived by mapping color histograms. Such color histograms can then be compared against stored color histograms associated with specified high level features. Based on the comparison, information of the image contents can be determined. Colors can also be determined and compared using different techniques (e.g., by using Gaussian models, Bayes classifiers, etc.).

In one embodiment, image properties detector 140 uses elliptical color models to determine high level features and/or image contents. An elliptical color model may be generated for a high level feature by mapping pixels of a set of images having the high level feature on the Hue, Saturation, Value (HSV) color space. The set of images can then be trained using a first training set of images having the high level feature, and a second training set of images that lacks the high level feature. An optimal elliptical color model is then determined by maximizing a statistical distance between the first training set of images and the second training set of images.

An image (e.g., of the input signal) can then be mapped on the HSV color space, and compared to the elliptical color model for the high level feature. The percentage of pixels in the image that match pixels in the elliptical color model can be used to estimate a probability that the image includes the high level image feature. This comparison can be determined using the equation:

$$d(I,T) = \hat{t} - \hat{i}$$

where $\hat{t}$ is the amount of pixels in the color elliptical model and $\hat{i}$ is the amount of pixels of the image that are also in the color elliptical model. If the image has a large amount of pixels $\hat{i}$ that match those of the color elliptical model $\hat{t}$, then a distance d(I,T) tends to be small, and it can be determined that the high level feature is present in the image.

If a high level feature includes multiple different colors, such as red flowers and green leaves, the high level feature can be segmented. A separate elliptical color model can be generated for each segment. An image mapped on the HSV color space can then be compared to each color elliptical model. If distances d(I,T) are small for both color elliptical models, then it can be determined that the high level feature is present in the image.

In one embodiment, image properties detector 140 analyzes the input signal to derive textures contained in the signal. Texture can be determined by finding visual patterns in images contained in the input signal. Texture can also include information on how images and visual patterns are spatially defined. Textures can be represented as texture elements (texels), which can be placed into a number of sets (e.g., arrays) depending on how many textures are detected in the image, how the texels are arranged, etc. The sets can define both textures and where in the image the textures are located. Such texels and sets can be compared to stored texels and sets associated with specified high level features to determine information of the image contents.

In one embodiment, image properties detector 140 uses wavelet-based texture feature extraction to determine high level features and/or image contents. Image properties detector 140 can include multiple texture models, each for specific image features or image contents. Each texture model can include wavelet coefficients and various values associated with wavelet coefficients, as described below. The wavelet coefficients and associated values can be compared to wavelet coefficients and associated values extracted from an input signal to determine whether any of the high level features and/or image contents are included in the video input signal.

Wavelet coefficients can be calculated, for example, by performing a Haar wavelet transformation on an image. Initial low level coefficients can be calculated by combining adjacent pixel values according to the formula:

$$L_i = (P_{2i} + P_{2i+1}) \frac{1}{\sqrt{2}}$$

where L is a low-frequency coefficient, i is an index number of the wavelet coefficient, and P is a pixel value from the image. Initial high level coefficients can be calculated by combining adjacent pixel values according to the formula:

$$H_i = (P_{2i} - P_{2i+1}) \frac{1}{\sqrt{2}}$$

where H is a high-frequency coefficient, i is an index number of the wavelet coefficient, and P is a pixel value from the image.

The Haar wavelet transformation can be applied recursively, such that it is performed on each initial low level coefficient and high level coefficient to produce second level coefficients. It can then be applied to the second level coefficients to produce third level coefficients, and so on, as necessary. In one embodiment, four levels of coefficients are used (e.g., four recursive wavelet transformations are calculated).

Wavelet coefficients from the multiple levels can be used to calculate coefficient mean absolute values for various subbands of the multiple levels. For example, coefficient mean absolute values μ for a given subband (e.g., the low-high (LH) subband) can be calculated using the formula:

$$\mu_{LH(i)} = \frac{1}{MN} \sum_{m=1}^{M} \sum_{n=1}^{N} |W_{LH(i)}[m,n]|$$

where LH(i) is an LH subband at level i, W is a wavelet coefficient, m is a coefficient row, n is a coefficient column, M is equal to a total number of coefficient rows, and N is equal to a total number of coefficient columns. Coefficient mean absolute values can also be determined for the other subbands (e.g., high-high (HH), high-low (HL) and low-low (LL)) of the multiple levels.

Wavelet coefficients for the multiple levels can be used to calculate coefficient variance values for the various subbands of the multiple levels. For example, coefficient variance values $\sigma^2$ can be calculated for a given subband LH using the formula:

$$\sigma^2_{LH(i)} = \frac{1}{MN} \sum_{m=1}^{M} \sum_{n=1}^{N} (|W_{LH(i)}[m,n]| - \mu_{LH(i)})^2$$

where LH(i) is an LH subband at level i, W is a wavelet coefficient, m is a coefficient row, n is a coefficient column, M is equal to a total number of coefficient rows, N is equal to a total number of coefficient columns, and μ is a corresponding coefficient mean absolute value. Coefficient variance values can also be determined for the other subbands (e.g., HH, HL and LL) of the multiple levels.

Mean absolute texture angles can then be calculated using the coefficient mean absolute values according to the formula:

$$\theta_{\mu(i)} = \arctan\frac{\mu_{LH(i)}}{\mu_{HL(i)}}$$

where $\theta_{\mu(i)}$ is a mean absolute value texture angle, μ is a coefficient mean absolute value, i is a subband level, LH is a Low-High subband, and HL is a High-Low subband.

Variance value texture angles can be calculated using the coefficient variance values according to the formula:

$$\theta_{\sigma(i)} = \arctan\frac{\sigma_{LH(i)}}{\sigma_{HL(i)}}$$

where $\theta_{\sigma(i)}$ is the variance value texture angle, σ is a coefficient variance value, i is a subband level, LH is a Low-High subband, and HL is a High-Low subband. The mean absolute texture angles and variance value texture angles together indicate how a texture is oriented in an image.

Total mean absolute values can be calculated according to the formula:

$$\mu_{(i)} = [\mu_{LH(i)}{}^2 + \mu_{HH(i)}{}^2 + \mu_{HL(i)}{}^2]$$

where $\mu_{(i)}$ is a total mean absolute value, i is a wavelet level, $\mu_{LH(i)}$ is a coefficient mean absolute value for an LH subband, $\mu_{HH(i)}$ is a coefficient mean absolute value for an HH subband, and $\mu_{HL(i)}$ is a coefficient mean absolute value for an HL subband.

Total variance values can be calculated according to the formula:

$$\sigma_{(i)}{}^2 = \sigma_{LH(i)}{}^2 + \sigma_{HH(i)}{}^2 + \sigma_{HL(i)}{}^2$$

where $\sigma_{(i)}$ is a total variance value, i is a wavelet level, $\sigma_{LH(i)}$ is a coefficient variance value for an LH subband, $\sigma_{HH(i)}$ is a coefficient variance value for an HH subband, and $\sigma_{HL(i)}$ is a coefficient variance value for an HL subband.

The total mean absolute values and total variance values can be used to calculate distance values between a texture model and an image of an input signal. The above discussed values can be calculated for a reference image or images having a high level feature to generate a texture model. The values can then be calculated for an input signal. The values for the video input signal are compared to the values for the texture model. If a distance D (representing texture similarity) between the two is small, then the input signal can be determined to include the high level feature. The distance D can be calculated using the equation:

$$D = \sum_{i=1}^{4} \frac{1}{2^i}\left[\mu_{(i)}^T \left|\theta_{\mu(i)}^T - \theta_{\mu(i)}^I\right| + \frac{1}{5}\left|\theta_{\sigma(i)}^T - \theta_{\sigma(i)}^I\right|\right]$$

where D is a distance value, T indicates the texture model, I indicates the test image, i is a wavelet level, μ is a total mean absolute value, σ is a total variance value, $\theta_\sigma$ is a variance value texture angle, and $\theta_\mu$ is a mean absolute value texture angle.

In one embodiment, image properties detector 140 determines shapes of regions within the image (e.g., image portions). Shapes can be determined by applying segmentation, blob extraction, edge detection and/or other known shape detection techniques to the image. Determined shapes can then be compared to a database of stored shapes to determine information about the image contents. Image properties detector 140 can then determine image content based on the detected image properties and/or image features. In one embodiment, image properties detector 140 uses a combination of derived image features to determine image contents.

In one embodiment, image properties detector 145 uses low level derived image features to determine high level image features. For example, the derived low level image features can be used to determine a person or persons, a landscape, a building, etc. Image properties detector 145 can combine the low level image features described above, as well as other low level image features known in the art, to determine high level image features. For example, a first shape, texture and color can correspond to a face, while a second shape, texture and color can correspond to a tree.

In one embodiment, signal analyzer 110 includes a motion detector 150. Motion detector 150 detects motion within images of a video input signal. Motion detector 150 can detect moving image portions, for example, by using motion vectors. Such motion vectors can be used to determine global motion (amount of total motion within a scene), and local motion (amount of motion within one or more image portions and/or amount that one or more features is detected to move). Motion detector 150 can also detect moving image portions by analyzing image properties such as blur. Directional blur can be detected that indicates movement of an object (or a camera) in the direction of the blur. A degree of blur can be used to estimate a speed of the moving object.

In one embodiment, signal analyzer 110 includes an audio properties detector 155. Audio properties detector 155 detects audio properties (features) of the input signal. Audio properties often exhibit a strong correlation to image features. Accordingly, in one embodiment such audio properties are used to better determine image contents. Examples of audio properties that can be detected and used to determine image features include cepstral flux, multi-channel cochlear decomposition, cepstral flux, multi-channel vectors, low energy fraction, spectral flux, spectral roll off point, zero crossing rate, variance of zero crossing rate, energy, and variance of energy.

Figure 1C:
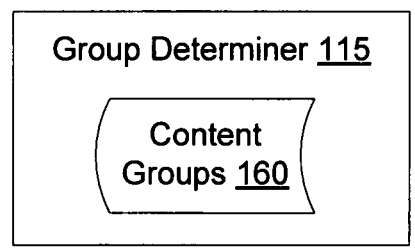
FIG. 1C illustrates an exemplary group determiner, in accordance with one embodiment of the present invention

FIG. 1C illustrates an exemplary group determiner 115, in accordance with one embodiment of the present invention. Group determiner 115 includes multiple content groups 160. Group determiner 115 receives low level and high level features that have been derived by signal analyzer 110. Based on the low level and/or high level features, group determiner 115 can determine a content group (also referred to as a content mode) for the input signal from the multiple content groups 160, and assign the determined content group to the signal. For example, if the derived image features include a sky, a natural landmark and no faces, a landscape group can be determined and assigned. If, on the other hand, multiple faces are detected without motion, a portrait group can be determined and assigned. In one embodiment, determining a content group includes automatically assigning that content group to the signal.

In one embodiment, group determiner 115 assigns a single content group from the multiple content groups 160 to the image. Alternatively, group determiner 115 can divide the image into multiple image portions. The image can be divided into multiple image portions based on spatial arrangements (e.g., top half of image vs. lower half of image), based on boundaries of derived features, or based on other criteria. Group determiner 115 can then determine a first content group for a first image portion containing first image features, and determine a second content group for a second image portion containing second image features. The input signal can also be divided into more than two image portions, each of which can be assigned different content groups.

Each of the content groups 160 can include predefined image properties for the reproduction of images in a specified environment (e.g., a cinema environment, a landscape environment, etc.). Each of the content groups can also include predefined audio properties for audio reproduction. Content groups 60 preferably provide optimal image properties and/or audio properties for the specified environment. The predefined image properties can be achieved by modifying image display settings of a display device. Alternatively, the predefined image properties can be achieved by modifying the input signal such that when displayed by a display having known image display settings, the image will be shown with the predefined image properties.

Exemplary content groups 160 are described below. It should be understood that these content groups 160 are for purposes of illustration, and that additional content groups 160 are envisioned.

In one embodiment, the content groups 160 include a default content group. The default content group can automatically be applied to all images until a different content group is determined. The default content group can include predefined image properties that provide a pleasing image in the most sets of circumstances. In one embodiment, the default content group provides increased sharpness, high contrast and high brightness for optimally displaying television programs.

In one embodiment, the content groups 160 include a portrait content group. The portrait content group includes predefined image properties that provide for images with optimal skin reproduction. The portrait content group can also include predefined image properties that better display still images. In one embodiment, the portrait content group provides predefined color settings for magenta, red and yellow tones that enable production of a healthy skin color with minimum color bias, and lowers sharpness to smooth out skin texture.

In one embodiment, the content groups 160 include a landscape content group. The landscape content group can include predefined image properties that enable vivid reproduction of images in the green-to-blue range (e.g., to better display blue skies, blue oceans, and green foliage). Landscape content group can also include a predefined image property of an increased sharpness.

In one embodiment, the content groups 160 include a sports content group. The sports content group can provide accurate depth and light/dark gradations, sharpen images by using gamma curve and saturation adjustments, and adjust color settings to that greens (e.g., football fields) appear more vibrant.

In one embodiment, the content groups 160 include a cinema content group. The cinema content group can use gamma curve correction to provide color compensation to clearly display dim scenes, while smoothing out image motion.

Examples of other possible content groups 160 include a text content group (in which text should have a high contrast with a background and have sharp edges), a news broadcast content group, a still picture content group, a game content group, a concert content group, and a home video content group.

Figure 2A:
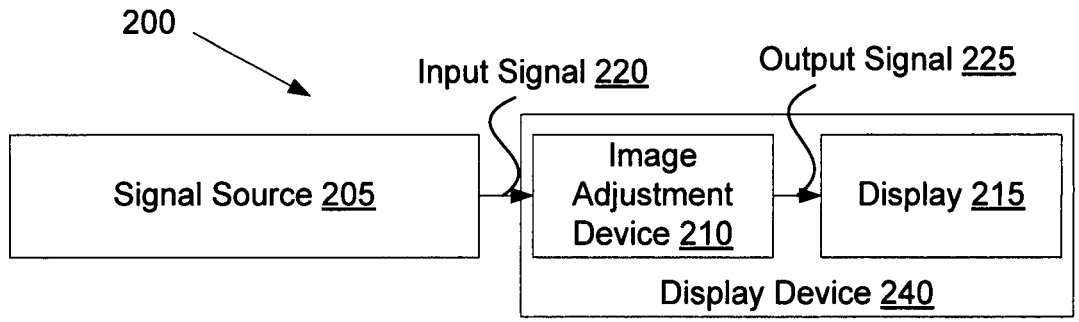
FIG. 2A illustrates an exemplary multimedia system, in accordance with one embodiment of the present invention.

FIG. 2A illustrates an exemplary multimedia system 200, in accordance with one embodiment of the present invention. Multimedia system 200 includes a signal source 205 coupled with a display device 240. Signal source 205 can generate one or more of a video signal, a still image signal and an audio signal. In one embodiment, signal source is a broadcast station, cable or satellite television provider, or other remote multimedia service provider. Alternatively, signal source can be a video cassette recorder (VCR), digital video disk (DVD) player, high definition digital versatile disk (HD-DVD) player, Blu-Ray® player, or other media playback device.

The means by which signal source 205 couples with display device 240 can depend on properties of the signal source 205 and/or properties of display device 240. For example, if signal source 205 is a broadcast television station, signal source 205 can be coupled with display device 240 via radio waves carrying a video signal. If on the other hand signal source 205 is a DVD player, for example, signal source 205 can couple with display device via an RCA cable, DVI cable, HDMI cable, etc.

Display device 240 can be a television, monitor, projector, or other device capable of displaying still and/or video images. Display device 240 can include an image adjustment device 210 coupled with a display 215. Image adjustment device 210 in one embodiment corresponds to image adjustment device 100 of FIG. 1A.

Display device 240 receives an input signal 220 from signal source 205. Image adjustment device 210 can modify image display settings such that an output signal shown on display 215 has predefined image properties of one or more determined content groups.

Figure 2B:
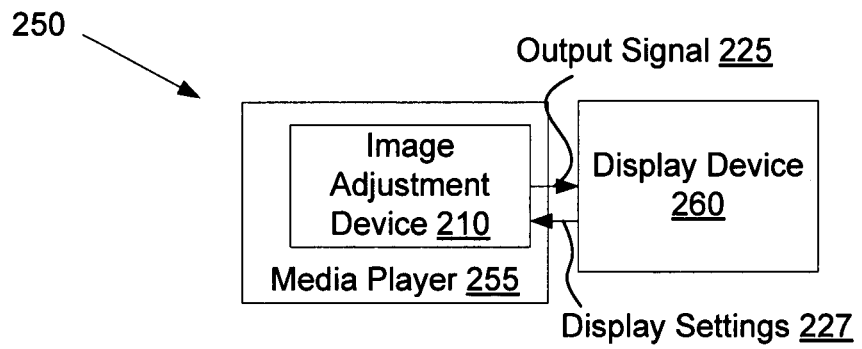
FIG. 2B illustrates an exemplary multimedia system, in accordance with another embodiment of the present invention.

FIG. 2B illustrates an exemplary multimedia system 250, in accordance with another embodiment of the present invention. Multimedia system 250 includes a media player 255 coupled with a display device 260. Media player 255 can be a VCR, DVD player, HD-DVD player, Blu-Ray® player, digital video recorder (DVR), or other media playback device, and can generate one or more of a video signal, a still image signal and an audio signal. In one embodiment, media player 255 includes image adjustment device 210, which can correspond to image adjustment device 100 of FIG. 1A.

Image adjustment device 210 can modify an input signal produced during media playback to generate an output signal 225. Output signal 225 can be transmitted to display device 260, which can display the output signal 225. In one embodiment, the signal adjustment device 210 adjusts the input signal such that the output signal, when displayed on display device 260, will show images having predefined image properties corresponding to one or more image content groups. To determine how to modify the input signal to display the predefined image properties on display device 260, signal adjustment device 210 can receive display settings 227 from display device 260. Given a specified set of display settings 227, the output signal 225 can be generated such that the predefined image properties will be displayed.

In another embodiment, output signal includes an unchanged input signal, as well as an additional signal (or metadata attached to the input signal) that directs the display device to use specified image display settings.

Figure 2C:
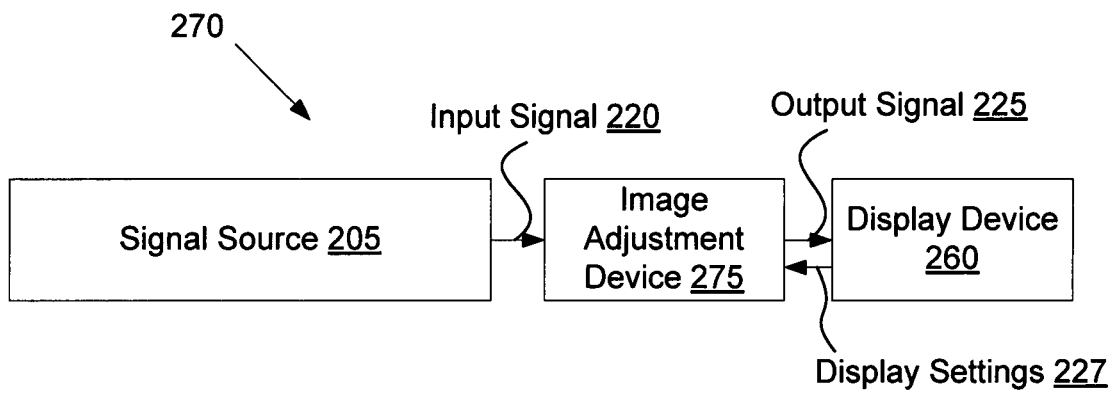
FIG. 2C illustrates an exemplary multimedia system, in accordance with yet another embodiment of the present invention.

FIG. 2C illustrates an exemplary multimedia system 270, in accordance with yet another embodiment of the present invention. Multimedia system 270 includes a signal source 205, an image adjustment device 275 and a display device 260.

As illustrated, image adjustment device 275 is disposed between, and coupled with, the signal source 205 and display device 260. Image adjustment device 275 can correspond to image adjustment device 100 of FIG. 1A. Image adjustment device 275 in one embodiment is a stand alone device used to modify signals transmitted to display device 260. Alternatively, image adjustment device 275 can be a component in, for example, a set top box, digital video recorder (DVR), cable box, satellite receiver, and so on.

Image adjustment device 275 can receive an input signal 220 generated by signal source 205. Image adjustment device 275 can then modify the input signal 220 to generate output signal 225, which can then be transmitted to display device 260. Display device 260 can then display output signal 225. Prior to generating output signal 225, signal adjustment device 275 can receive display settings 227 from display device 260. The received display settings can then be used to determine how the input signal should be modified to generate the output signal.

The particular methods of the invention are described in terms of computer software with reference to a series of flow diagrams, illustrated in FIGS. 3-6. Flow diagrams illustrated in FIGS. 3-6 illustrate methods of modifying an image, and can be performed by image adjustment device 100 of FIG. 1A. The methods constitute computer programs made up of computer-executable instructions illustrated, for example, as blocks (acts) 305 until 335 in FIG. 3. Describing the methods by reference to a flow diagram enables one skilled in the art to develop such programs including such instructions to carry out the methods on suitably configured computers or computing devices (the processor of the computer executing the instructions from computer-readable media, including memory). The computer-executable instructions can be written in a computer programming language or can be embodied in firmware logic. If written in a programming language conforming to a recognized standard, such instructions can be executed on a variety of hardware platforms and for interface to a variety of operating systems.

The present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be appreciated that more or fewer processes can be incorporated into the methods illustrated in FIGS. 3-6 without departing from the scope of the invention, and that no particular order is implied by the arrangement of blocks shown and described herein.

Figure 3:
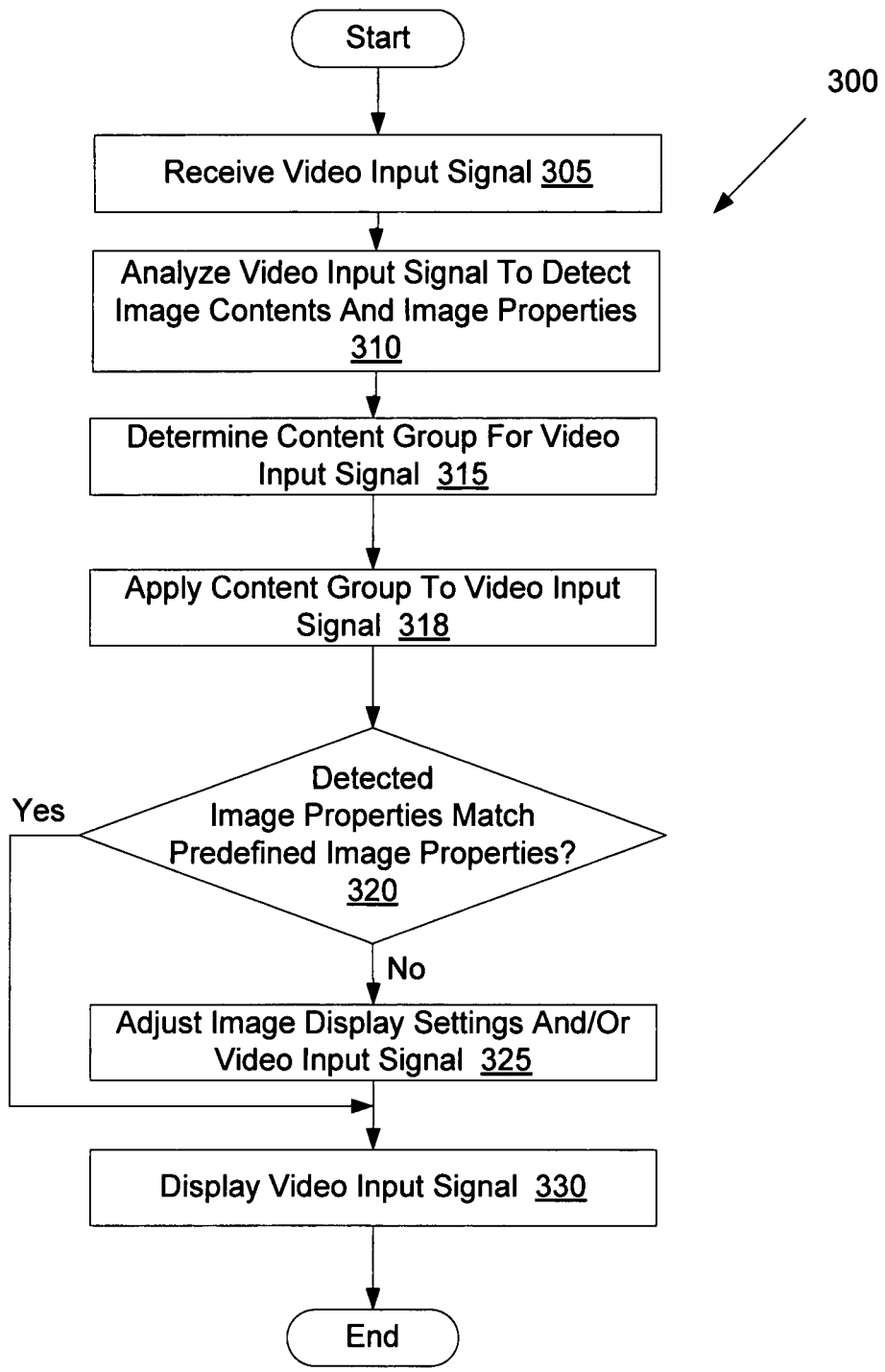
FIG. 3 illustrates a method of modifying an image, in accordance with one embodiment of the present invention.

Referring first to FIG. 3, the acts to be performed by a computer executing a method 300 of modifying an image are shown.

In a particular implementation of the invention, method 300 receives (e.g., by input terminal 105 of FIG. 1A) a video input signal (block 305). At block 310, the video input signal is analyzed (e.g., by signal analyzer 110 of FIG. 1A) to detect image properties and image contents. In further embodiments, the video input signal can also be analyzed to detect signal properties (e.g., to determine whether the signal is interlaced or non-interlaced, whether the signal is compressed or uncompressed, a noise level of the signal, etc). If the signal is compressed, it can be necessary to decompress the signal before determining one or more image properties and/or image contents.

The video input signal can be analyzed on a frame-by-frame basis. Alternatively, a sequence of frames of the video input signal can be analyzed together such that any modifications occur to each of the frames in the sequence. Image properties can include image size, image resolution, dynamic range, color cast, blur, etc. Image contents can be detected by deriving low level image features (e.g., texture, color, shape, etc.) and high level image features (e.g., faces, people, buildings, sky, etc.). Such image features can be derived automatically upon receipt of the video input signal.

At block 315, a content group is determined (e.g., by group determiner 115 of FIG. 1A) for the video input signal. The content group can be determined based on the detected image contents. In a further embodiment, the content group is determined using metadata included in the video signal. Metadata can provide information about the image content and/or image properties. For example, the metadata can identify a current scene of a movie as an action scene. At block 318, the content group is applied to the input video signal.

At block 320, it is determined whether detected image properties match predefined image properties associated with the determined content group. If the detected image properties match the predefined image properties, the method proceeds to block 330. If the detected image properties do not match the predefined image properties, the method continues to block 325.

At block 325, image display settings and/or the video input signal are adjusted (e.g., by image adjustor 120 of FIG. 1A). The image display settings and/or video input signal can be adjusted based on a difference between the detected image properties and the predefined image properties. This permits the input signal to be displayed such that the predefined image properties are shown. At block 330, the video input signal is displayed. The method then ends.

Though method 300 is shown to have specific blocks in which different tasks are performed, it is foreseeable that some of the tasks performed by some of the blocks can be separated and/or combined. For example, block 310 shows that the video input signal is analyzed to determine the image contents and image properties together. However, the video signal can be analyzed to detect image contents without determining image properties. A content group can then be determined, after which the signal can be analyzed to determine image properties. In another example, block 315 (determining a content group) and block 318 (assigning a content group) can be combined into a single block (e.g., into a single action). Other modifications to the described method are also foreseeable.

Figure 4:
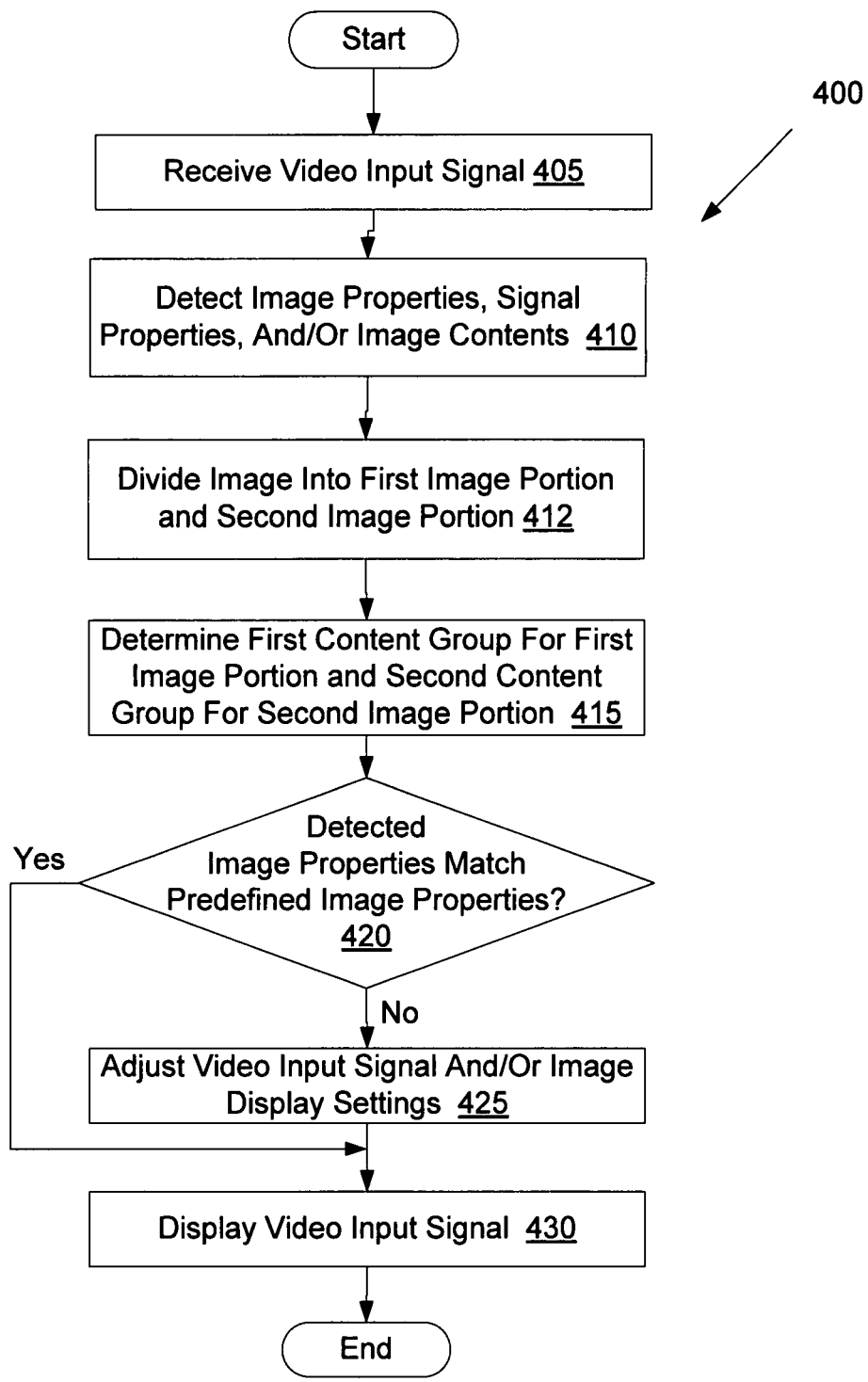
FIG. 4 illustrates a method of modifying an image, in accordance with another embodiment of the present invention.

Referring now to FIG. 4, the acts to be performed by a computer executing a method 400 of modifying an image are shown.

In a particular implementation of the invention, method 400 includes receiving (e.g., by input terminal 105 of FIG. 1A) a video input signal (block 405). At block 410, image properties, signal properties and/or image contents are detected (e.g., by signal analyzer 110 of FIG. 1A). At block 412, the image is divided into a first image portion and a second image portion. In one embodiment, the image is divided into the first image portion and the second image portion based on boundaries of image features. Alternatively, the division can be based on separation of the image into equal or unequal parts. For example, the image can be divided into a first half (e.g., top half or right half) and a second half (e.g., bottom half or left half). The first image portion can include first image features and the second image portion can include second image features.

At block 415, a first content group is determined (e.g., by group determiner 115 of FIG. 1A) for the first image portion and a second content group is determined for the second image portion. Determining the first content group and the second content group can include applying a first content group, and a second content group, respectively. The first content group can include first predefined image properties, and the second content group can include second predefined image properties. The first content group and second content group can be determined based on the detected image contents of each image portion, respectively.

At block 420, it is determined whether detected image properties match predefined image properties associated with the determined content groups and/or assigned content groups. If the detected image properties match the predefined image properties, the method proceeds to block 430. If the detected image properties do not match the predefined image properties, the method continues to block 425.

At block 425, image display settings and/or the video input signal are adjusted (e.g., by image adjustor 120 of FIG. 1A) such that the detected image properties match the predefined image properties of the first image portion and second image portion, respectively. Image display settings and/or the video input signal can be adjusted for the first image portion based on a difference between the first detected image properties and the first predefined image properties of first content group. Image display settings and or the video input signal can be adjusted for the second image portion based on a difference between the second detected image properties and the second predefined image properties of the second content group. At block 430, the video input signal is displayed. The method then ends.

Figure 5:
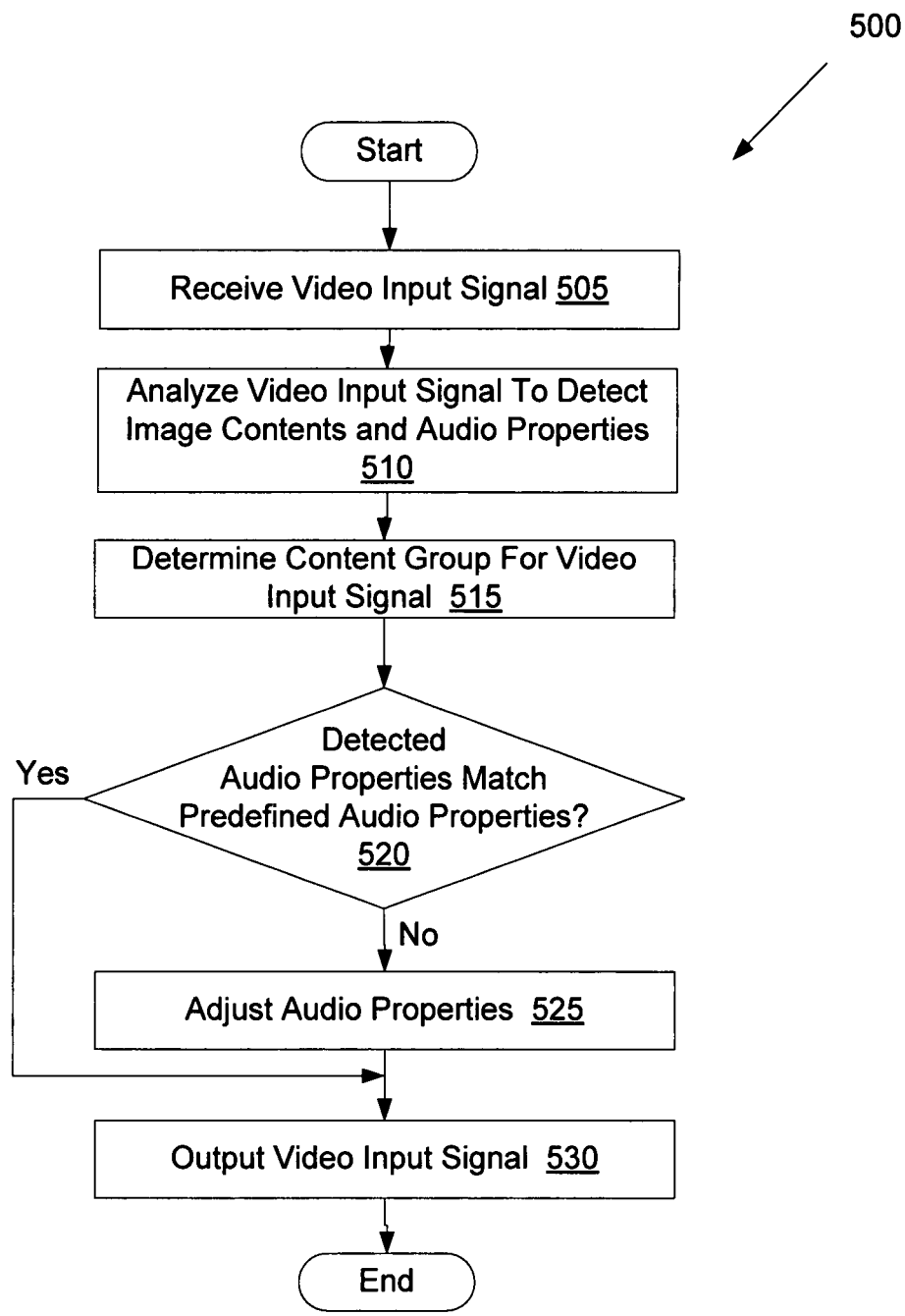
FIG. 5 illustrates a method of modifying an image, in accordance with yet embodiment of the present invention.

Referring now to FIG. 5, the acts to be performed by a computer executing a method 500 of modifying an audio output are shown.

In a particular implementation of the invention, method 500 includes receiving (e.g., by input terminal 105 of FIG. 1A) a video input signal (block 505). At block 510, the video input signal is analyzed (e.g., by signal analyzer 110 of FIG. 1A) to detect audio properties and image contents. Audio properties can include cepstral flux, multi-channel cochlear decomposition, multi-channel vectors, low energy fraction, spectral flux, spectral roll off point, zero crossing rate, variance of zero crossing rate, energy, variance of energy, etc. At block 515, a content group is determined (e.g., by group determiner 115 of FIG. 1A) for the video input signal. The content group can be determined based on the detected image contents, and can include predefined audio properties.

At block 520, it is determined whether detected audio properties match predefined audio properties associated with the determined content group. If the detected audio properties match the predefined audio properties, the method proceeds to block 530. If the detected audio properties do not match the predefined audio properties, the method continues to block 525.

At block 525, audio settings and/or an audio portion of the video input signal are adjusted (e.g., by audio adjustor 125 of FIG. 1A). The audio settings and/or the audio portion of the video input signal can be adjusted based on a difference between the detected audio properties and the predefined audio properties. Examples of audio settings that can be adjusted include volume, playback speed and equalization. At block 530, the video input signal is output (e.g., transmitted and/or played). The method then ends.

Figure 6:
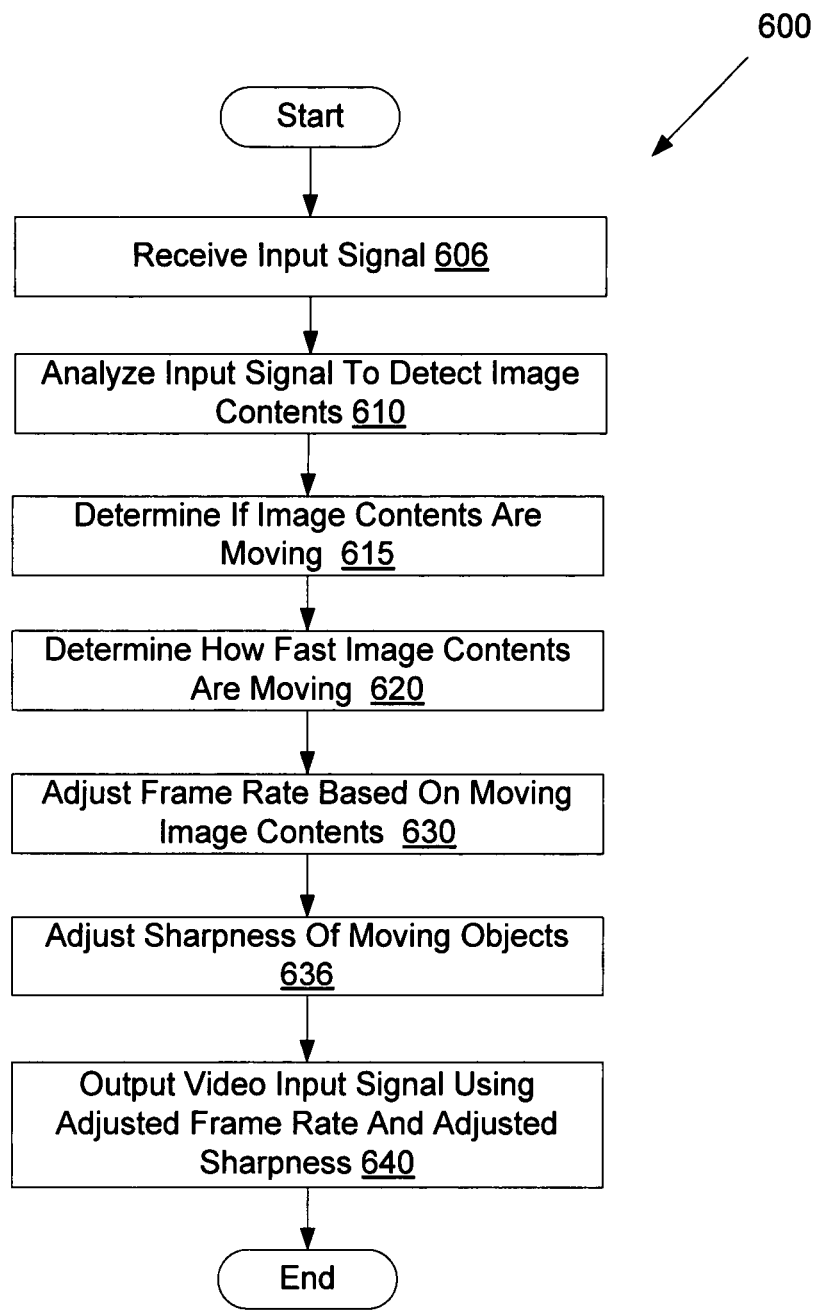
FIG. 6 illustrates a method of modifying an input signal, in accordance with one embodiment of the present invention.

Referring now to FIG. 6, the acts to be performed by a computer executing a method 600 of modifying an image are shown.

In a particular implementation of the invention, method 600 includes receiving (e.g., by input terminal 105 of FIG. 1A) a video input signal (block 606). At block 610, the video input signal is analyzed (e.g., by signal analyzer 110 of FIG. 1A) to detect image contents. At block 615, it is determined whether the image contents are moving. Such a determination can be made, for example, using motion vectors or by detected a degree and direction of blur. At block 620, it is determined how fast the image contents are moving.

At block 630, a frame rate of the video signal is adjusted (e.g., by frame rate adjustor 112 of FIG. 1A) based on how fast the image contents are moving. For example, the frame rate can be increased as the image contents are detected to move faster. At block 636, a sharpness of the moving objects is adjusted (e.g., by image adjustor 120 of FIG. 1A). Alternatively, a sharpness of the entire signal can be adjusted. The sharpness adjustment can be based on how fast the image contents are moving.

At block 640, the video input signal is output (e.g., transmitted and/or displayed) using the adjusted frame rate and the adjusted sharpness. The method then ends.

Figure 7:
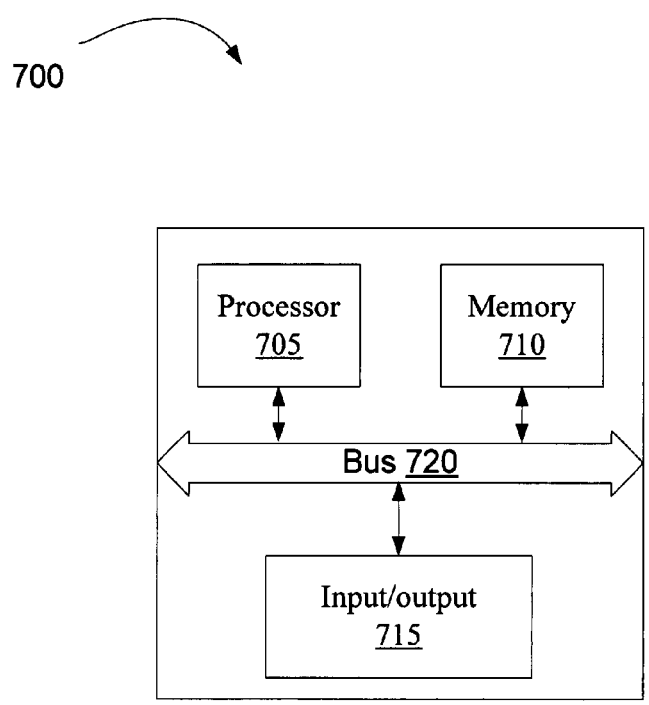
FIG. 7 illustrates a block diagram of a machine in the exemplary form of a computer system, on which embodiments of the present invention can operate.

FIG. 7 illustrates a block diagram of a machine in the exemplary form of a computer system 700 within which a set of instructions, for causing the machine to perform any one or more of the methodologies discussed herein, can be executed. The exemplary computer system 700 includes a processing device (processor) 705, a memory 710 (e.g., read-only memory (ROM), a storage device, a static memory, etc.), and an input/output 715, which communicate with each other via a bus 720. Embodiments of the present invention can be performed by the computer system 700, and/or by additional hardware components (not shown), or can be embodied in machine-executable instructions, which can be used to cause processor 705, when programmed with the instructions, to perform the methods described above. Alternatively, the methods can be performed by a combination of hardware and software.

Processor 705 represents one or more general-purpose processing devices such as a microprocessor, central processing unit, or the like. More particularly, the processor 705 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 705 can also be one or more special-purpose processing devices such as an application specific integrated circuit (ASIC), a field programmable gate array (FPGA), a digital signal processor (DSP), network processor, or the like.

The present invention can be provided as a computer program product, or software, that can be stored in memory 710. Memory 710 can include a machine-readable medium having stored thereon instructions, which can be used to program exemplary computer system 700 (or other electronic devices) to perform a process according to the present invention. Other machine-readable mediums which can have instruction stored thereon to program exemplary computer system 700 (or other electronic devices) include, but are not limited to, floppy diskettes, optical disks, CD-ROMs, and magneto-optical disks, ROMs, RAMs, EPROMs, EEPROMs, magnetic or optical cards, flash memory, or other type of media or machine-readable mediums suitable for storing electronic instructions.

Input/output 715 can provide communication with additional devices and/or components. Thereby, input/output 715 can transmit data to and receive data from, for example, networked computers, servers, mobile devices, etc.

The description of FIG. 7 is intended to provide an overview of computer hardware and other operating components suitable for implementing the invention, but is not intended to limit the applicable environments. It will be appreciated that the computer system 700 of FIG. 7 is one example of many possible computer systems which have different architectures. One of skill in the art will appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

A device and method for modifying a signal has been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention. For example, those of ordinary skill within the art will appreciate that image content detection algorithms and techniques other than those described can be used.

The terminology used in this application with respect to modifying a signal is meant to include all devices and environments in which a signal can be modified. Therefore, it is manifestly intended that this invention be limited only by the following claims and equivalents thereof.

What is claimed is:

1. A computerized method comprising:
    analyzing a video input signal to detect image content and image properties, wherein detecting the image content includes automatically deriving image features;
    determining a content group for the video input signal based on a directional blur of a motion of an object in the detected image content, the object occupying a portion of the detected image content, the content group including predefined image properties and the content group represents a type of image composition captured in the video input signal; and
    adjusting at least one of image display settings and the video input signal based on a difference between the detected image properties and the predefined image properties.

2. The computerized method of claim 1, wherein the video input signal is further analyzed to detect signal properties, and wherein the content group is determined based on the detected image content and the signal properties.

3. The computerized method of claim 2, wherein the signal properties comprise metadata that provides information about at least one of the image content and the image properties, and wherein the content group is determined using the metadata.

4. The computerized method of claim 1, wherein the detected image content includes a first image portion having first image properties and a second image portion having second image properties, further comprising:
    determining a first content group for the first image portion, the first content group including first predefined image properties;
    determining a second content group for the second image portion, the second content group including second predefined image properties;
    adjusting at least one of the image display settings and the video input signal for the first image portion based on a difference between the first image properties and the first predefined image properties; and
    adjusting at least one of the image display settings and the video input signal for the second image portion based on a difference between the second image properties and the second predefined image properties.

5. The computerized method of claim 1, further comprising:
    receiving current image display settings of a display; and
    outputting an output signal to the display that, when shown on the display using the received image display settings, will have the predefined image properties.

6. The computerized method of claim 1, further comprising:
    receiving the video input signal.

7. The computerized method of claim 1, wherein the video input signal includes detected audio properties and the content group includes predefined audio properties, further comprising:
    adjusting audio settings based on a difference between the detected audio properties and the predefined audio properties.

8. A non-transitory machine-readable medium including instructions that, when executed by a machine having a processor, cause the processor to perform a computerized method comprising:
    analyzing a video input signal to detect image content and image properties, wherein detecting the image content includes automatically deriving image features;
    determining a content group for the video input signal based on a directional blur of a motion of an object in the detected image content, the object occupying a portion of the detected image content, the content group including predefined image properties and the content group represents a type of image composition captured in the video input signal; and
    adjusting at least one of image display settings and the video input signal based on a difference between the detected image properties and the predefined image properties.

9. The non-transitory machine-readable medium of claim 8, wherein the video input signal is further analyzed to detect signal properties, and wherein the content group is determined based on the detected image content and the signal properties.

10. The non-transitory machine-readable medium of claim 9, wherein the signal properties comprise metadata that provides information about at least one of the image content and the image properties, and wherein the content group is determined using the metadata.

11. The non-transitory machine-readable medium of claim 8, wherein the detected image content includes a first image portion having first image properties and a second image portion having second image properties, the computerized method further comprising:
    determining a first content group for the first image portion, the first content group including first predefined image properties;
    determining a second content group for the second image portion, the second content group including second predefined image properties;
    adjusting at least one of the image display settings and the video input signal for the first image portion based on a difference between the first image properties and the first predefined image properties; and
    adjusting at least one of the image display settings and the video input signal for the second image portion based on a difference between the second image properties and the second predefined image properties.

12. The non-transitory machine-readable medium of claim 8, the computerized method further comprising:
    receiving current image display settings of a display; and
    outputting an output signal to the display that, when shown on the display using the received image display settings, will have the predefined image properties.

13. The non-transitory machine-readable medium of claim 8, wherein the input video signal includes metadata that provides information about at least one of the image content and the image properties, and wherein the content group is determined using the metadata.

14. The non-transitory machine-readable medium of claim 8, wherein the video input signal includes detected audio properties and the content group includes predefined audio properties, the computerized method further comprising:
adjusting audio settings based on a difference between the detected audio properties and the predefined audio properties.

15. The non-transitory machine-readable medium of claim 14, wherein adjusting the audio properties comprises at least one of adjusting volume, adjusting equalization, and adjusting audio speed.

16. An apparatus comprising:
means for analyzing a video input signal to detect image content and image properties, wherein detecting the image content includes automatically deriving image features;
means for determining a content group for the video input signal based on a directional blur of a motion of an object in the detected image content, the object occupying a portion of the detected image content, the content group including predefined image properties and the content group represents a type of image composition captured in the video input signal; and
means for adjusting at least one of image display settings and the video input signal based on a difference between the detected image properties and the predefined image properties.

17. The apparatus of claim 16, wherein:
the means for analyzing the video input signal further to detect signal properties; and
means for determining the content group based on the detected image content and the signal properties.

18. The apparatus of claim 16, wherein the detected image content includes a first image portion having first image properties and a second image portion having second image properties, further comprising:
means for determining a first content group for the first image portion, the first content group including first predefined image properties;
means for determining a second content group for the second image portion, the second content group including second predefined image properties;
means for adjusting at least one of the image display settings and the video input signal for the first image portion based on a difference between the first image properties and the first predefined image properties; and
means for adjusting at least one of the image display settings and the video input signal for the second image portion based on a difference between the second image properties and the second predefined image properties.

19. The apparatus of claim 16, further comprising:
means for receiving current image display settings of a display; and
means for outputting an output signal to the display that, when shown on the display using the received image display settings, will have the predefined image properties.

20. The apparatus of claim 16, wherein the video input signal includes detected audio properties and the content group includes predefined audio properties, further comprising:
adjusting audio settings based on a difference between the detected audio properties and the predefined audio properties.

21. A computerized system comprising:
a processor;
a memory coupled to the processor though a bus;
an analyzer process executed from the memory by the processor to cause the processor to analyze a video input signal to detect image content and image properties, wherein detecting the image content includes automatically deriving image features;
a group determiner process executed from the memory by the processor to cause the processor to determine a content group for the video input signal based on a directional blur of a motion of an object in the detected image content, the object occupying a portion of the detected image content, the content group including predefined image properties and the content group represents a type of image composition captured in the video input signal; and
an adjustor process executed from the memory by the processor to cause the processor to adjust at least one of image display settings and the video input signal based on a difference between the detected image properties and the predefined image properties.

22. The computerized method of claim 1, wherein the content group is selected from the group consisting of a portrait group, a landscape group, a sports group, a cinema content group, a text content group, a still picture content group, a concert content group, and a home video content group.

23. The computerized method of claim 1, wherein the determining the content group is further based on a distribution of colors in the video input signal.

* * * * *